United States Patent
Kirk

(10) Patent No.: US 6,216,350 B1
(45) Date of Patent: Apr. 17, 2001

(54) COPING SAW WITH MULTI-DIRECTIONAL CUTTING BLADE WITH TWO CUTTING SURFACES

(76) Inventor: Norbert Kirk, 307 W. Wood Dr., Phoenix, AZ (US) 85029

(*) Notice: Subject to any disclaimer, the term of this patent is extended or adjusted under 35 U.S.C. 154(b) by 0 days.

(21) Appl. No.: 09/489,837

(22) Filed: Jan. 24, 2000

Related U.S. Application Data

(63) Continuation-in-part of application No. 09/433,577, filed on Nov. 4, 1999.

(51) Int. Cl.$^7$ .................................................. B27B 21/00
(52) U.S. Cl. ............................................. 30/509; 30/507
(58) Field of Search ........................... 30/166.3, 507–513, 30/519; 83/835, 837

(56) References Cited

U.S. PATENT DOCUMENTS

| | | | | |
|---|---|---|---|---|
| 1,081,135 | * | 12/1913 | Nelson | 83/837 |
| 1,411,899 | * | 4/1922 | Baker | 83/835 |
| 1,548,393 | | 8/1925 | Strvg | 30/509 |
| 1,882,328 | * | 10/1932 | Kinkel | 83/835 |
| 2,514,609 | * | 7/1950 | Roy | 83/835 |
| 3,324,910 | * | 6/1967 | Benedict | 30/166.5 |
| 3,589,418 | * | 6/1971 | Clark | 30/513 |
| 3,642,038 | | 2/1972 | Mannes | 30/392 |
| 3,680,610 | * | 8/1972 | Lindgren | 83/835 |
| 4,095,635 | | 6/1978 | Hutchins | 30/509 |

* cited by examiner

*Primary Examiner*—Douglas D. Watts
(74) *Attorney, Agent, or Firm*—George H. Miller, Jr.

(57) ABSTRACT

A thin saw blade with four cutting surfaces of fixed lengths in line, each cutting surface rotated with respect to the preceding cutting surface to enable a user to change cutting directions of the blade without rotating the material to be cut. A second embodiment uses a blade with two cutting surfaces of fixed length with cutting surfaces on opposed edges of the blade requiring only a single twist and enabling cutting of thicker pieces of material with longer strokes. A preferred embodiment uses the blade in a coping saw with each rotation being 90 degrees enabling rapid smooth cuts of thin materials for handicraft projects. Rubber O-rings secure the blade in anchor bolt slots to secure the blade while cutting in different directions. The blade could also be used in electric sabre saws or bench jig saws which would require adjustment of the work support surface to change cutting directions.

7 Claims, 3 Drawing Sheets

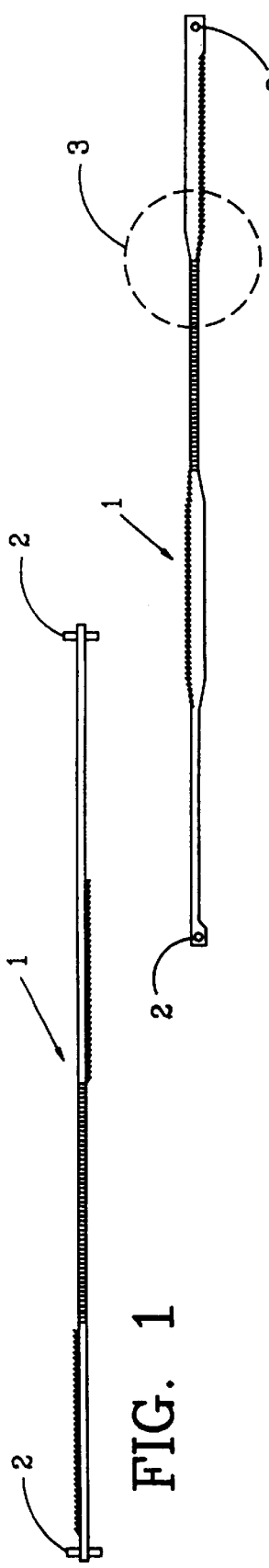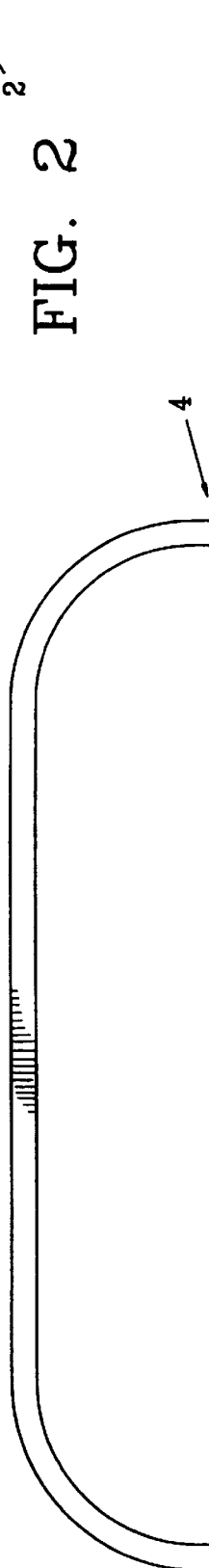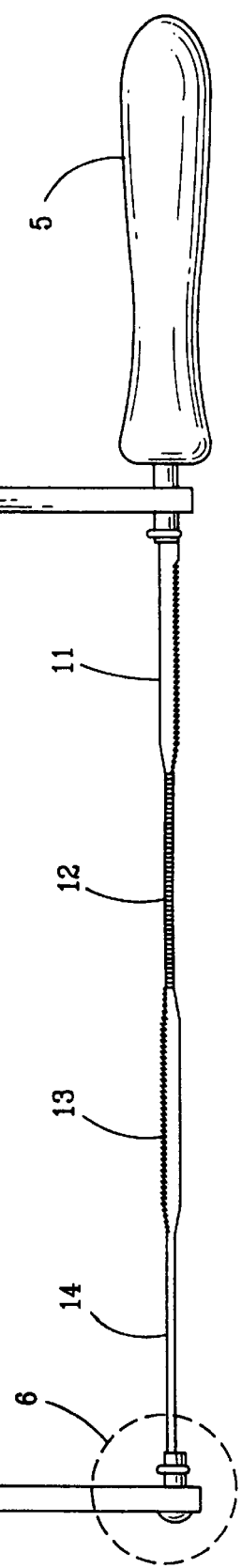

COPING SAW WITH MULTI-DIRECTIONAL CUTTING BLADE WITH TWO CUTTING SURFACES

This application is a Continuation-In-Part of Ser. No. 09/433,577 filed Nov. 4, 1999 pending.

BACKGROUND OF THE INVENTION

Coping saws, sometimes referred to as scroll saws, are well known as manually reciprocating tools for cutting through thin materials such as plywood, masonite, balsa wood, plastic and soft metals. A conventional coping saw blade has perpendicular pins at each end that engage slots in anchor bolts at the tips of a U-frame. The U-frame has an aperture at one tip for an anchor bolt with a head and an aperture at the other tip for an anchor bolt with a thread for attaching a handle and tensioning the blade between the two tips of the U-frame. U.S. Pat. No. 4,095,635 to Hutchins is an example of an improved blade holding system using the conventional blade with pins at the ends and anchor bolt slots.

The blade is customarily mounted with the blade cutting surface away from the tips of the U-frame. However, as disclosed in Hutchins, the anchor bolts can be rotated in the apertures to change the direction of the cutting surface of the blade.

The depth of the U-frame determines the dimension that a cut can be made inside from the edge of material to be cut. By rotating the blade 90 degrees by the anchor bolts, a second cut can be made parallel to that same edge. By rotating the blade an additional 90 degrees by the anchor bolts, a third cut can be made to return to the edge of the material resulting in the separation of a rectangular piece of material. The kerf of these cuts will be the thickness of the saw blade.

The rotation of the saw blade by the anchor bolts enables a user to obtain smooth cuts but it requires stopping the sawing motion to rotate the handle to relieve the tension on the blade so that the blade can be rotated via the anchor bolts to the desired angle. The handle is then rotated to re-tension the blade and sawing motion resumed. This is considered to be inconvenient, time consuming and increases the wear on the threaded handle and anchor bolt interface.

U.S. Pat. No. 1,548,393 to Strug is an earlier effort to permit a rotary adjustment of a coping saw blade to any desired angle to the workpiece by an adjustment of ratchet wheels with leaf springs intersecting the teeth of the ratchet wheels. Again, the sawing motion in Strug must be stopped to permit the angular adjustment as in Hutchins.

U.S. Pat. No. 2,514,609 to Roy is an effort to permit multi-directional coping saw cutting without interrupting the sawing motion. Roy discloses a blade with teeth extending continuously and spirally in a helical manner around a hardened cylindrical wire body. The kerf of the cut is the diameter of the wire plus the additional extending teeth depth. The cutting action is more of a ripping action with the teeth not aligned with a thin backing support resulting in a cut that is not as smooth and thin as a conventional coping saw cut.

U.S. Pat. No. 3,642,038 to Mannes is another effort to permit multi-directional cutting in a sabre saw in which the user is not limited to the depth of a U-frame as in a coping saw because the blade is only connected at one end. However, in Mannes as in Roy, the cutting action is a ripping action and the kerf is not very thin and smooth.

It is an object of the present invention to provide a saw blade that can be used in a coping saw U-frame to provide a smooth cut in multiple directions without changing the setting of the blade and without changing the orientation of the saw. This is accomplished by an axial movement of the saw blade that will rotate the cutting surface 90 degrees each in three increments resulting in four different cutting directions. Within each increment, the cutting surface permits enough reciprocating movement to perform a conventional smooth and thin cut.

It is a further object of the present invention to provide rubber O-rings to secure anchoring pins in the anchor bolts to prevent broken blades from being propelled when a blade breaks and the spring tension of the U-frame is released.

It is a further object of the present invention to provide a coping saw that is safe, convenient to use and requiring less time to use by children in handicraft classes where they can develop manual dexterity and coordination in using prescribed sawing motion and axial adjustment to achieve desired directional cutting changes.

It is a further object of the invention to provide a coping saw that is an improvement over Hutchins, Strug, Roy and Mannes, incorporated herein by reference, in the features of those prior art saws as explained above.

SUMMARY OF THE INVENTION

The above stated and related objects are achieved in a saw blade that can be used in a conventional coping saw in a slightly revised conventional manner. The blade has a single cutting surface of four segments that can transition from straight cutting 90 degrees to the left, then to a cutting surface 180 degrees to the reverse, then to a cutting surface 270 degrees to the right and finally to the first cutting surface.

In this manner, a rectangular piece can be cut out from a piece of material by a continuous reciprocating cutting motion and axial adjustment of the blade while cutting to transition to each of the four cutting directions.

The U-frame support can also be simplified by eliminating the anchor bolt at the front end of the blade and providing a fixed integral anchor slot for inserting the blade pins. Since there is no need to rotate an anchor bolt to change the cutting direction, the anchor can be fixed. Also, the handle portion with the threaded anchor bolt can be converted to a non-cylindrical interface between the anchor and the aperture to avoid any unwanted rotation while sawing and transitioning through the 90 degree segments.

Rubber O-rings are used to secure the blade and pins in the slots at the ends of the blade.

BRIEF DESCRIPTION OF THE DRAWINGS

FIG. 1 is a top view of a coping saw blade with four cutting surface directions.

FIG. 2 is a side view of the coping saw blade.

FIG. 3 is a view of the blade in a conventional coping saw frame.

DETAILED DESCRIPTION OF THE INVENTION

FIGS. 1 and 2 show the saw blade 1 in an embodiment of its intended use in a coping saw. At each end are pins 2 that can be inserted in slots in two anchor bolts in a U-frame 4 as shown in FIG. 3. Handle 5 is threadedly attached to one of the anchor bolts and can provide tension on the blade.

Figure 4:
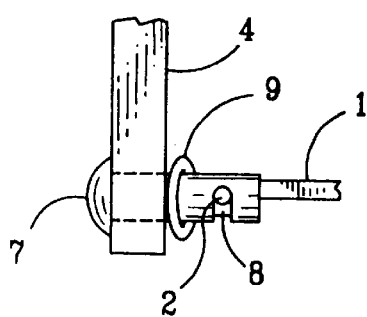
FIG. 4 is an enlarged view of the encircled forward anchor for the front blade support of FIG. 3 showing the use of a rubber O-ring for improved anchoring of the blade.

FIG. 4 is an enlarged view of 6 off FIG. 3 showing blade 1 with pin 2 inserted into slot 8 of anchor bolt 7 to secure the far end of the blade in the U-frame 4. The other near end of the blade is similarly anchored in an anchor bolt that is threadedly attached to the handle.

FIG. 4 also shows rubber O-ring 9 tightly secured around the anchor bolt away from the slot prior to insertion of pin 2 into slot 8. Another O-ring would be similarly situated on the anchor bolt on the other end of blade 1 that is attached to the handle. After insertion of the pins, the O-rings are moved over to the slot to better secure the pin in the respective slots for sawing in different directions. Also, in case of blade breakage, the broken blade will not be propelled by the spring force of the U-frame.

Figure 5:
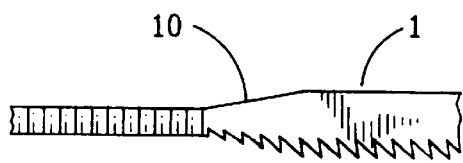
FIG. 5 is an enlarged view of the encircled 90 degree transition from the first cutting surface to the second cutting surface of FIG. 2.

FIG. 5 shows the enlarged portion 3 from FIG. 2 of the first transition from the straight cutting surface to one rotated 90 degrees to the left. This transition covers about ⅛ to 3/16 of an inch and occurs at two other transition points along the blade as shown to the left in FIGS. 1 and 2.

Figure 6:
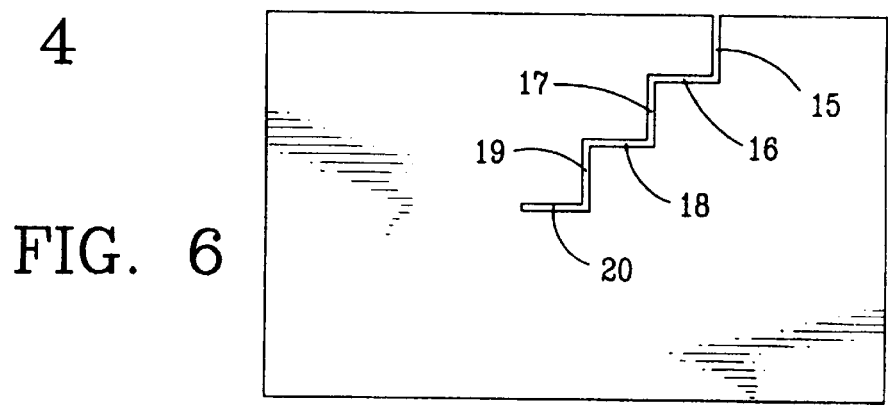
FIG. 6 is a view of a stepping cut using the blade.
Figure 7:
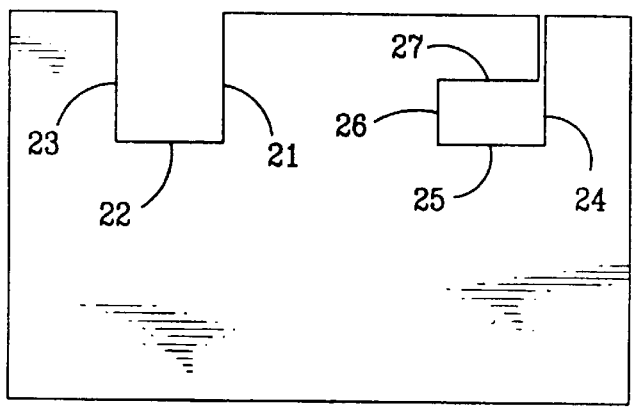
FIG. 7 is an illustration of two cuts demonstrating use of the blade to remove a rectangular piece (1) from the edge of a piece of material and (2) from within a piece of material.

FIGS. 6 and 7 disclose the operation of the saw in cutting material in different directions using cutting surfaces 11, 12, 13 and 14 as shown in FIG. 3.

In FIG. 6, the cut is achieved by initiating the cut with cutting surface 11 to the end of the first cut 15, pushing the blade through to engage cutting surface 12 and applying pressure to the left while sawing for the given distance 16, pulling the blade back to re-engage cutting surface 11, making cut 17 for the given distance, pushing the blade through again to engage cutting surface 12 to perform cut 18, pulling the blade back to perform cut 19 and, finally, pushing the blade through again to engage cutting surface 12 to complete cut 20.

In FIG. 7, the cut-out section on the left is achieved by initiating the cut 21 with cutting surface 11 to the end of the first cut 21, pushing the blade through to engage cutting surface 12 and applying pressure to the left while sawing for the given distance 22, pushing the blade through to engage cutting surface 13 and applying upward pressure while sawing to complete cut 23 to the edge of the material.

In FIG. 7, the cut-out section on the right is achieved by initiating the cut 24 with cutting surface 11 to the end of the first cut 24, pushing the blade through to engage cutting surface 12 and applying pressure to the left while sawing for the given distance 25, pushing the blade through to engage cutting surface 13 and applying upward pressure while sawing to complete cut 26, pushing the blade through to cutting surface 14 and applying pressure to the right while sawing to the end of cut 27 resulting in the rectangular section bounded by 24-25-26-27 dropping out of the material.

Figure 8:
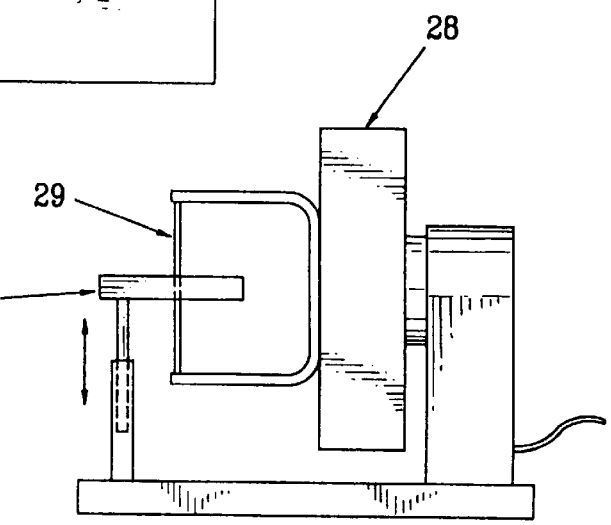
FIG. 8 is a view of a second embodiment of the blade using a blade with cutting surfaces on opposite edges with only a single central twist.
Figure 9A:
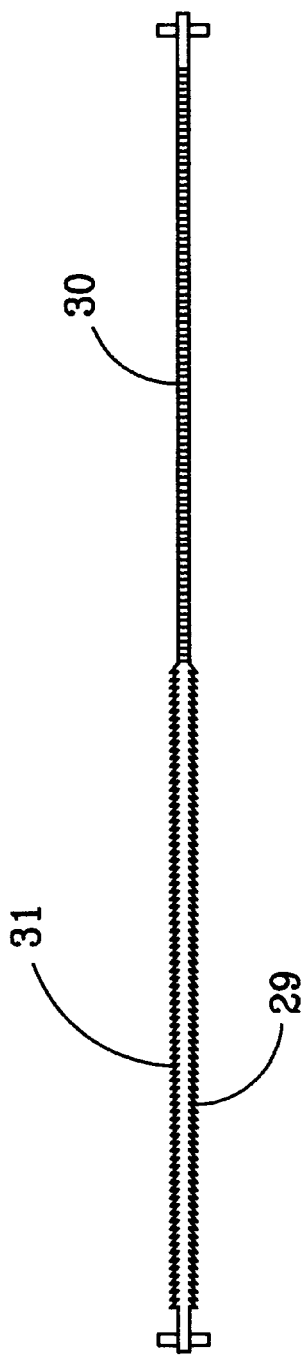
Figure 9B:
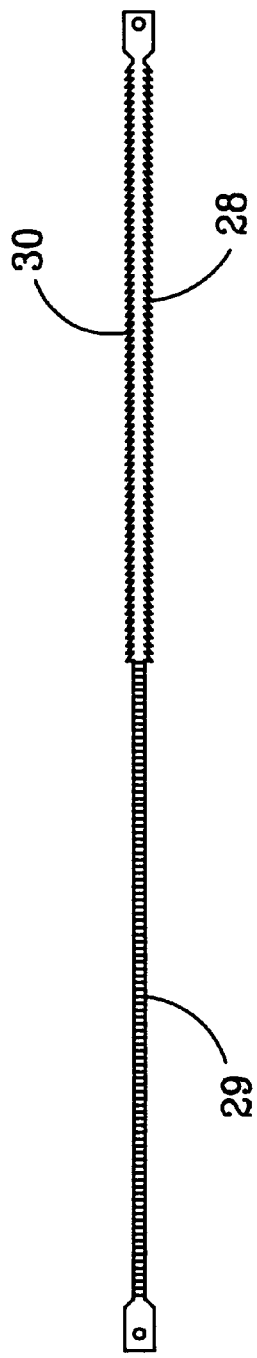

In FIGS. 8A and 8B, another embodiment of the blade contains cutting surfaces on opposite sides of the blade and provides a longer cutting stroke for cutting thicker pieces of material. Using this embodiment in making the cut-out section in FIG. 7 on the right, cutting surface 28 initiates cut 24 to the end of the first cut 24, the blade is pushed through to engage cutting surface 29 and pressure is applied to the left while sawing for the given distance 25, the blade is pulled back to engage cutting surface 30 and pressure is applied upward while sawing to complete cut 26, the blade is pushed through to cutting surface 31 and pressure applied to the right while sawing to the end of cut 27 resulting in the rectangular section bounded by 24-25-26-27 dropping out of the material. To change direction in cutting, only the single 90 degree twist is required in the center of the blade and another 90 degree twist at the end for mounting the blade when it is inserted in a coping saw U-frame.

The preferred embodiment of the blade is to be used in a coping saw comprising a U-frame as described above. However, in view of the Mannes disclosure above, another embodiment of the blade could be used in an electric sabre saw (with one end support) or an electric bench jig saw with both ends supported where an electric motor is the reciprocating mover (instead of manual movement as in the preferred coping saw movement). However, in each of these cases, sawing would be interrupted because a shoe or work supporting surface would have to be adjusted relative to the cutting surface along the length of the blade to perform the needed change of cutting direction.

Having described the preferred embodiment and obvious modifications of it, there may be others that are obvious and are also intended to be covered by this disclosure.

What is claimed is:

1. A thin saw blade having means for support at least at a first end for connecting the saw blade to a reciprocating mover, the saw blade having a first fixed length having cutting surfaces on two opposed edges ending in a short axial transition from the first fixed length to another orientation in line that is angularly rotated from the first fixed length to a second fixed length having cutting surfaces on two opposed edges.

2. A thin saw blade in accordance with claim 1 in which the blade is mounted in an electric reciprocating mover and a work engaging surface is moved axially with respect to the blade to change the cutting directions of the blade.

3. A thin saw blade in accordance with claim 1 in which the axial transition comprises a rotation of 90 degrees.

4. A thin saw blade in accordance with claim 3 with an additional short axial transition from the second fixed length to a second end of the saw blade resulting in a complete rotation from the first cutting surface of 180 degrees.

5. A thin saw blade in accordance with claim 4 in which the blade has pins extending perpendicularly from each end and the pins anchor the blade in slots in anchor bolts in a coping saw frame.

6. A thin saw blade in accordance with claim 5 in which rubber O-rings are on each anchor bolt and are engaged in the slots containing the pins.

7. A saw blade mounted in a coping saw frame, the blade having two straight cutting lengths having cutting surfaces on two opposed edges each approximately one-half the length of the blade in series with one half angularly rotated 90 degrees from the other with a final 90 degree rotation with the blade ends having pins extending perpendicularly from each end and the pins anchoring the blade in slots in anchor bolts in the coping saw frame.

* * * * *